United States Patent [19]
Walling

[11] Patent Number: 5,468,030
[45] Date of Patent: Nov. 21, 1995

[54] TUBE CLAMP AND COUPLING

[75] Inventor: Dennis R. Walling, Lafayette, Ind.

[73] Assignee: Caterpillar Inc., Peoria, Ill.

[21] Appl. No.: 411,914

[22] Filed: Mar. 28, 1995

Related U.S. Application Data

[60] which is a continuation of Ser. No. 177,046, Jan. 4, 1994, abandoned.

[51] Int. Cl.$^6$ .................................................. F16L 21/06
[52] U.S. Cl. ........................... 285/364; 285/415; 285/420
[58] Field of Search ...................... 285/414, 415, 285/420, 364, 368, 302

[56] References Cited

U.S. PATENT DOCUMENTS

| | | | |
|---|---|---|---|
| 2,911,239 | 11/1959 | Marzole, Sr. | 285/415 |
| 3,415,547 | 12/1968 | Shinkichi | 285/415 |
| 3,761,114 | 9/1973 | Blakeley | 285/415 |
| 3,942,141 | 3/1976 | Kaffenberger | 285/414 |
| 4,529,232 | 7/1985 | Schaeffer et al. | 285/415 |
| 4,568,112 | 2/1986 | Bradley, Jr. et al. | 285/415 |
| 4,660,266 | 4/1987 | Horn | 285/415 |
| 4,779,900 | 10/1988 | Shumard | 285/415 |
| 4,981,311 | 1/1991 | Kinney | 285/302 |

FOREIGN PATENT DOCUMENTS 6709 of 1886 United Kingdom ................... 285/415

Primary Examiner—Eric K. Nicholson
Attorney, Agent, or Firm—Dennis C. Skarvan

[57] ABSTRACT

A coupling assembly is disclosed for connecting a tube to a housing member. Preferably, the coupling assembly includes a tube end having a pair of spaced apart annular beads defining a groove for receiving a resilient seal ring seated therein and a housing member defining a bore for receiving the tube end. Also, a guide ring preferably centers the tube end in the bore. A clamping assembly is provided according to the present invention which includes symmetric clamping members, each defining a tube engaging portion between a seat portion and a seat engaging portion. The clamping members assemble axially and resiliently flex relative one another to clamp onto the tube as the seat portions axially engage the seat engaging portions.

18 Claims, 2 Drawing Sheets

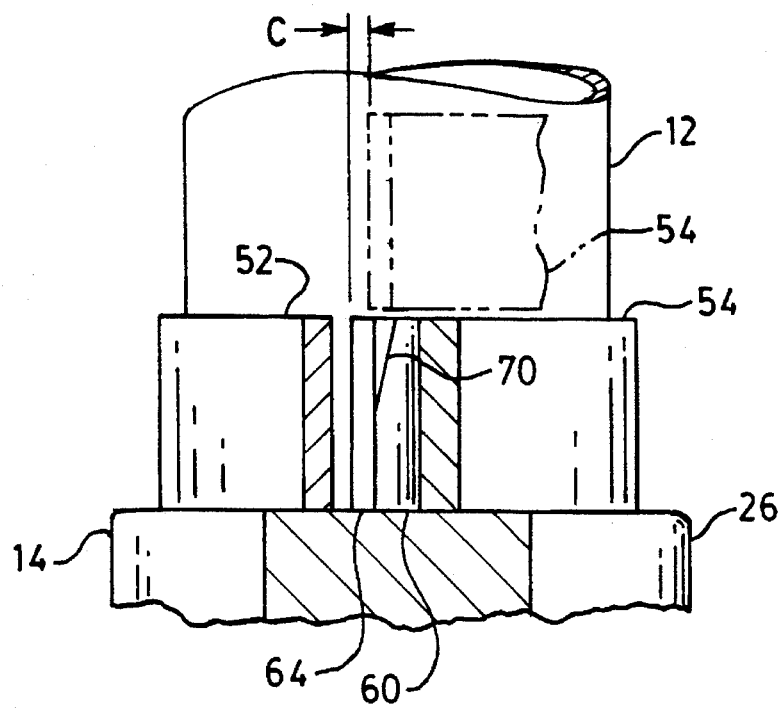
Fig_3_
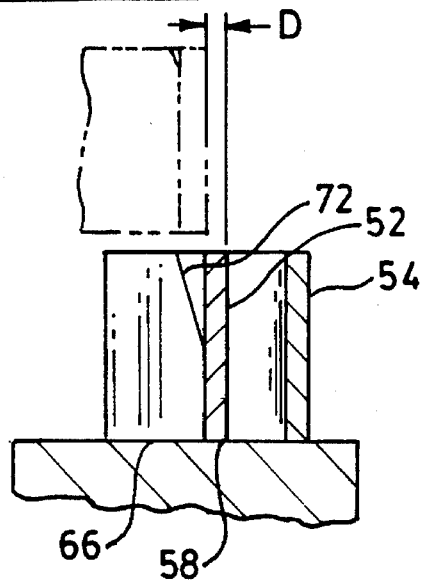
Fig_4_

5,468,030

1

TUBE CLAMP AND COUPLING

This is a file wrapper continuation of application Ser. No. 08/177,046, filed January 4, 1994, now abandoned.

TECHNICAL FIELD

This invention relates generally to an assembly for coupling a tube to a housing and, more particularly, to a tube clamp for use in a coupling assembly mounted to a housing.

BACKGROUND ART

In construction equipment it is often necessary to couple a tube, such as a fluid line, to another housing or other such mating member for transfer of fluid between the tube and housing. Typically, the tube includes sealing means relative to the housing to prevent loss of fluid. Preferably, safeguards are employed to prevent damage of the sealing means during installation of the tube with the housing.

One example of such a fluid coupling is shown in U.S. Pat. No. 4,981,311. In U.S. Pat. No. 4,981,311, a coupling assembly is disclosed in which a pair of clamping bands are provided that clamp about a tube via a first set of fasteners. The fastened clamping bands are then clamped to a housing via a second set of fasteners to maintain the tube in fixed relation relative to the housing. Although such a coupling is superior over prior art couplings, examples of which include U.S. Pat. Nos. 4,522,433, 4,588,309, 4,603,886 and 4,615,812 and French Patent No. 1,420,486, some applications require a coupling having a reduced overall envelope.

In some engine applications where both assembly and installation working space are restricted, it is desirable to minimize the overall coupling envelope to fit within the limited space available, such as within the envelope of a housing portion. It is desirable as well to minimize the number of fasteners required to assemble the coupling to ease assembly and installation of the coupling. The present invention is therefore directed to providing one or both of the aforementioned features in conjunction with a fluid coupling.

DISCLOSURE OF INVENTION

An interlocking clamp assembly adapted for receipt clamped about a tube is disclosed according to one embodiment of the present invention, comprising a first clamping member, the first clamping member defining a first seat portion, a first seat engaging portion and a first tube engaging portion between the first seat portion and the first seat engaging portion, and a second clamping member, the second clamping member defining a second seat portion, a second seat engaging portion and a second tube engaging portion between the second seat portion and the second seat engaging portion, the first seat portion being axially received in the second seat engaging portion and the second seat portion being axially received in the first seat engaging portion to resiliently compress the first tube engaging portion and the second tube engaging portion together about the tube member.

According to another embodiment of the present invention, a coupling assembly is disclosed, comprising a tube member defining a central axis, a housing member adapted for receiving an end of the tube member coupled therewith, a first clamping member defining a first seat portion, a first seat engaging portion and a first tube engaging portion between the first seat portion and the first seat engaging

2 portion, a second clamping member defining a second seat portion, a second seat engaging portion and a second tube engaging portion between the second seat portion and the second seat engaging portion, the first clamping member interlocking with the second clamping member about the tube member to resiliently compress the first tube engaging portion and the second tube engaging portion together about the tube member, the first seat portion being axially received in the second seat engaging portion and the second seat portion being axially received in the first seat engaging portion, and means for clamping the first clamping member and the second clamping member to the housing member.

BRIEF DESCRIPTION OF THE DRAWINGS

FIG. 3 is a side elevational, partial cross-sectional view of the coupling, wherein the assembly of the coupling is indicated by phantom lines, taken along line 3—3 of FIG. 2.

FIG. 4 is a side elevational, partial cross-sectional view of the coupling, wherein the assembly of the coupling is indicated by phantom lines, taken along line 4—4 of FIG. 2.

BEST MODE FOR CARRYING OUT THE INVENTION

Figure 1:
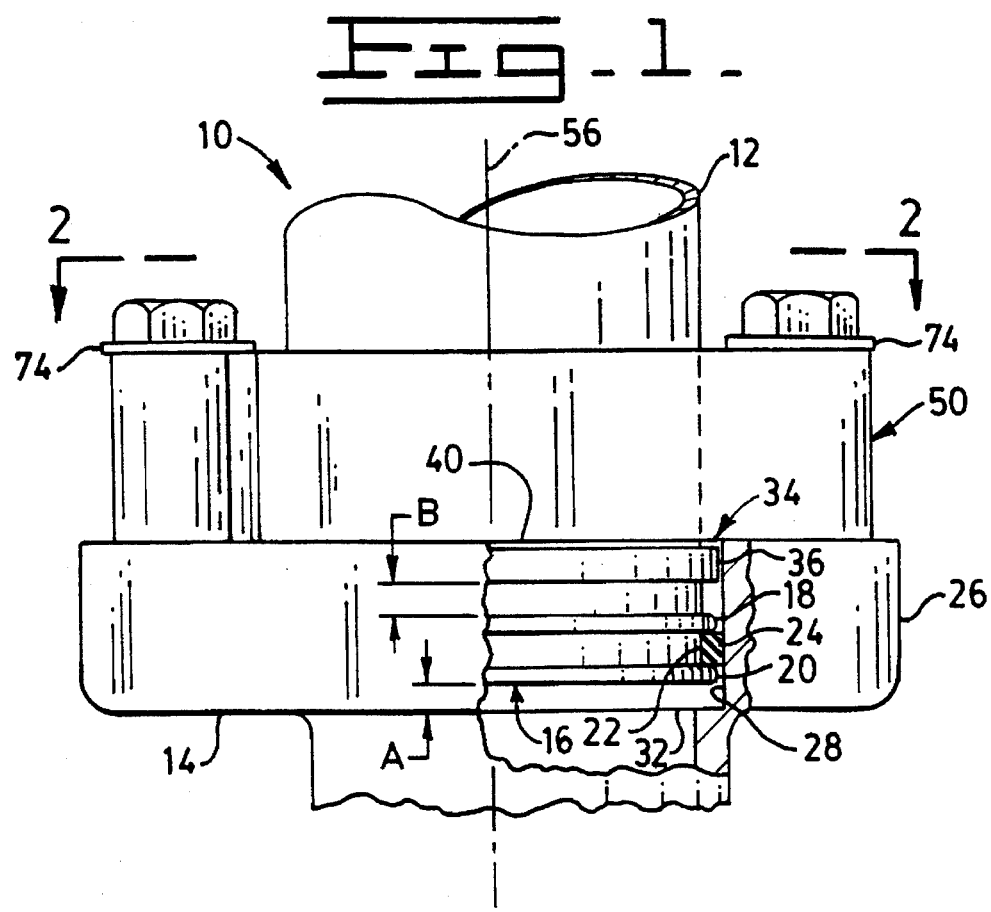
FIG. 1 is a side elevational view of a coupling according to one embodiment of the present invention.
Figure 2:
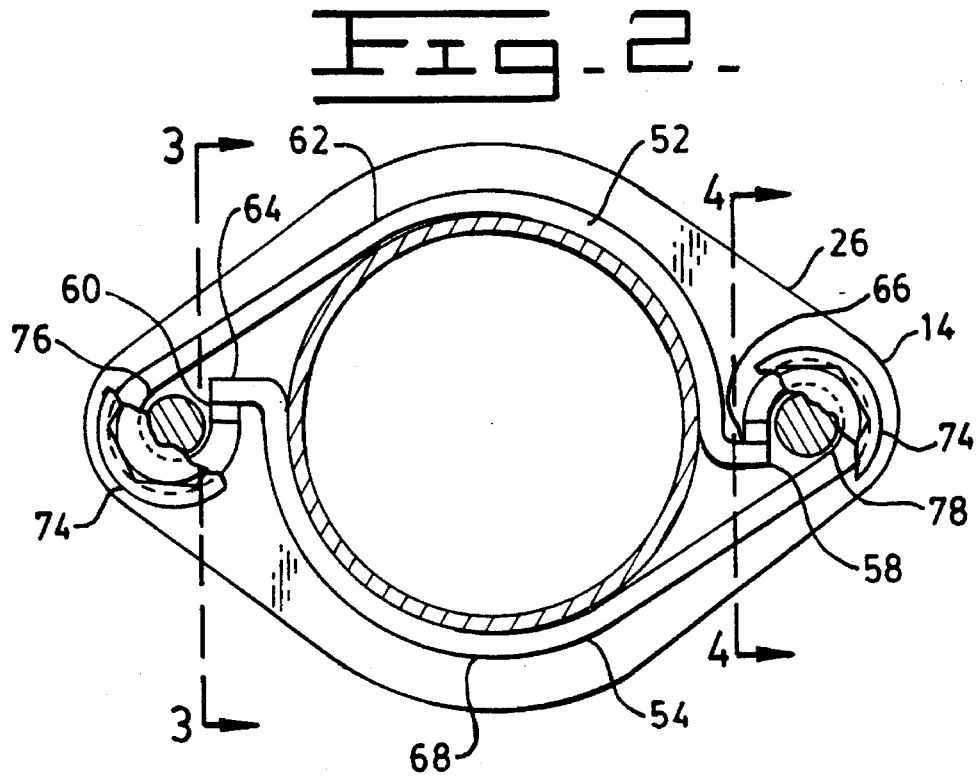
FIG. 2 is a plan view of the coupling taken along line 2—2 of FIG. 1.

Referring generally to FIGS. 1 and 2, a coupling assembly 10 is shown similar to the coupling assembly shown in U.S. Pat. No. 4,981,311 to Kinney issuing Jan. 1, 1991, the contents of which are hereby incorporated by reference. As disclosed in U.S. Pat. No. 4,981,311, coupling assembly 10 includes a first member 12 coupled to a second member 14. Member 12 is a male tube having an end 16 on which is formed a pair of spaced upset beads 18 and 20. Beads 18 and 20 define a groove 22 in which a relatively soft resilient seal ring or O-ring 24 is seated. O-ring 24 is constructed of a material such as ethylene propylene diene (EPDM) rubber with a durometer Shore "A" hardness of approximately 70, or fluorocarbon rubber (FKM) with a durometer Shore "A" hardness of approximately 75.

Member 14 is a female mating member having an end or housing portion 26 that defines an opening or bore 28. End 16 of tube 12 is received in bore 28 with an axial clearance "A", preferably about 5 mm, defined between bead 20 and end 32 of bore 28. Clearance "A" permits tube 12 to move axially downward, for example, during assembly or as a result of thermal expansion. In the assembled position, O-ring 24 is in sealing engagement with bore 28.

As further shown in U.S. Pat. No. 4,981,311, coupling assembly 10 includes guide ring means 34 for locating end 16 of tube 12 in a substantially centered position within bore 28. Guide ring means 34 includes a guide ring 36 preferably having a generally rectangular cross-section which extends into bore 28 a certain distance below annular top outer surface 40 of housing portion 26 and in upwardly spaced relation to the adjacent bead 18. As such, guide ring 36 defines a cavity or clearance "B" between the guide ring and the bead 18. This clearance allows end 16 of tube 12 to move upwardly within bore 28 until contact is made with guide ring 36. Guide ring 36 thus acts as a positive stop in the coupling assembly for maintaining tube 12 engaged with bore 28. Guide ring 36 is preferably a split ring made of a non-metallic material including, for example, heat stabilized polycaprolactum (type 6) nylon thermoplastic having a durometer Rockwell "M" hardness of from 60–80. The hardness of guide ring 36 preferably is greater than that of O-ring 24.

According to the present invention, coupling assembly 10 includes a clamping assembly 50 which, unlike clamping assembly 50 of U.S. Pat. No. 4,981,311, secures to tube 12 within the envelope defined by housing member 14, as best depicted in FIG. 2. Further, unlike clamping assembly 50 of U.S. Pat. No. 4,981,311, clamping assembly 50 of the present invention includes a pair of symmetric clamping bands 52 and 54 that assemble onto tube 12 axially along, rather than radially about, a central axis 56 defined by tube 12. As such, not only are the assembled clamping bands 52 and 54 within the envelope defined by housing member 14, but also the installation of clamping bands 52 and 54 is accomplished within the envelope defined by housing member 14.

Clamping band 52 defines a stepped or flanged seat portion 58 at an end thereof and corresponding seat engaging portion 60 at an end opposite seat portion 58. Defined between seat portion 58 and seat engaging portion 60 is an arcuate tube engaging portion 62 having a shape substantially matching the cylindrical shape of tube 12 when clamped thereto. Clamping member 54 defines a like seat portion 64, seat engaging portion 66 and tube engaging portion 68. Although like or symmetric clamping bands are desirable for ease in manufacturing and assembly, asymmetric bands are also contemplated for use with asymmetric tubing.

Seat engaging portions 60 and 66 include like or symmetric axial lead-in portions 70 and 72, respectively (FIGS. 3 and 4). Lead-in portions 70 and 72 are adapted for receiving respective seat portions 64 and 58 therein to ease axial engagement between clamping bands 52 and 54. In particular, as clamping band 52 is assembled axially with clamping band 54, the seat portions of each band engage with the corresponding lead-in portions of the respective other band to radially compress the bands like distances "C" and "D" and thereby clamp about tube 12. The amount of clamp load applied to tube 12 is a function of the material choice and thickness, as well as the deflections "C" and "D", chosen for the bands to accommodate the particular type of coupling and application loads. In the coupling described herein, for example, which employs guide ring means 34 as a positive stop, the clamp load required is typically not as high as that required in a coupling not having guide or stop means.

Regardless of the particular coupling design, by providing interlocking clamping bands which resiliently flex radially inward relative one another during assembly, a set of fasteners is eliminated by the present invention to ease assembly and installation. Further, by providing clamping bands which assemble axially relative one another, the installation as well as the assembled envelope is reduced to approximately the envelope of housing portion 26.

Means for clamping or fastening the clamped tube to housing portion 26 are provided by headed bolts 74 which thread within housing portion 26 to clamp bands 52 and 54 thereagainst. Rather than fabricating or otherwise securing tubular lugs to each of the bands as shown in U.S. Pat. No. 4,981,311, each of clamping bands 52 and 54 is formed defining fastener throughholes or bores 76 and 78 at the seat engaging ends. Clamping assembly 50 is removably secured to the top outer surface 40 of housing portion 26 by securing fasteners 74 across bores 76 and 78.

I claim:

1. An interlocking clamp assembly adapted for receipt clamped about a tube, the tube defining a central axis and the clamp assembly assembling onto the tube axially along the central axis, the clamp assembly comprising:

a first clamping member, said first clamping member defining a first seat portion, a first seat engaging portion and a first tube engaging portion between said first seat portion and said first seat engaging portion; and a second clamping member, said second clamping member defining a second seat portion interlockable with said first seat engaging portion, a second seat engaging portion interlockable with said first seat portion and a second tube engaging portion between said second seat portion and said second seat engaging portion;

said first seat portion including a first axial lead-in portion and said second seat engaging portion including a second axial lead-in portion, said first seat engaging portion and said second seat portion radially flexing relative to one another as said second seat portion is axially received in said first axial lead-in portion and said second seat engaging portion and said first seat portion radially flexing relative to one another as said first seat portion is axially received in said second axial leads-in portion to resiliently compress said first tube engaging portion and said second tube engaging portion about the tube and resiliently restrain said first seat engaging portion against said second seat portion and said second seat engaging portion against said first seat portion to interlock said first clamping member with said second clamping member.

2. The interlocking clamp assembly of claim 1, wherein said first clamping member is symmetric with said second clamping member.

3. The interlocking clamp assembly of claim 2, wherein said first clamping band defines a first throughhole and said second clamping band defines a second throughhole, said first throughhole and said second throughhole being adapted for receiving first and second fasteners therethrough.

4. The interlocking clamp assembly of claim 3, wherein said first throughhole is adjacent to said first seat engaging portion and said second throughhole is adjacent to said second seat engaging portion.

5. A coupling assembly, comprising:

a tube member defining a central axis;

a housing member adapted for receiving an end of said tube member coupled therewith;

a first clamping member defining a first seat portion, a first seat engaging portion and a first tube engaging portion between said first seat portion and said first seat engaging portion;

a second clamping member defining a second seat portion interlockable with said first seat engaging portion, a second seat engaging portion interlockable with said first seat portion and a second tube engaging portion between said second seat portion and said second seat engaging portion;

said first seat engaging portion and said second seat portion radially flexing relative to one another as said second seat portion is axially received by said first seat engaging portion and said second seat engaging portion and said first seat portion radially flexing relative to one another as said first seat portion is axially received by said second seat engaging portion to resiliently compress said first tube engaging portion and said second tube engaging portion about the tube and resiliently restrain said first seat engaging portion against said second seat portion and said second seat engaging portion against said first seat portion to interlock said first clamping member with said second clamping member; and means for clamping said first clamping member and said second clamping member to said housing member.

6. The coupling assembly of claim 5, wherein said housing member defines a cylindrical bore adapted for receiving said end of said tube member axially therein.

7. The coupling assembly of claim 6, wherein said end of said tube member includes a pair of spaced apart annular beads defining a groove therebetween and a resilient seal ring seated in said groove, said end of said tube member being sealingly received in said cylindrical bore with said resilient seal ring compressed within said groove and between said end of said tube member and said cylindrical bore.

8. The coupling assembly of claim 7, and further comprising guide ring means for locating said end of said tube member in a substantially centered position within said cylindrical bore, said guide ring means preventing said annular beads from contacting said cylindrical bore while permitting axial movement of said end of said tube member within said cylindrical bore.

9. The coupling assembly of claim 8, wherein said guide ring means includes a guide ring having a hardness greater than that of said seal ring, said guide ring being seated relatively tightly about said end of said tube member adjacent to one of said annular beads and extending into said cylindrical bore.

10. The coupling assembly of claim 5, wherein said first clamping member is symmetric with said second clamping member.

11. The interlocking clamp assembly of claim 10, wherein said first seat engaging portion includes a first axial lead-in portion adapted for receiving said second seat portion therein and said second seat engaging portion includes a second axial lead-in portion adapted for receiving said first seat portion therein.

12. The interlocking clamp assembly of claim 11, wherein said first clamping band defines a first throughhole and said second clamping band defines a second throughhole, said first throughhole and said second throughhole receiving first and second fasteners therethrough threaded to said housing member.

13. The interlocking clamp assembly of claim 12, wherein said first throughhole is adjacent to said first seat engaging portion and said second throughhole is adjacent to said second seat engaging portion.

14. In a coupling assembly for releasably connecting a tube member to a housing member defining a cylindrical bore, the coupling assembly including a clamping assembly releasably connected to the tube member, the clamping assembly including first and second clamping bands that encompass the tube member, the improvement comprising:

said first clamping band defining a first seat portion, a first seat engaging portion and a first tube engaging portion between said first seat portion and said first seat engaging portion; and said second clamping band defining a second seat portion interlockable with said first seat engaging portion, a second seat engaging portion interlockable with said first seat portion and a second tube engaging portion between said second seat portion and said second seat engaging portion;

said first seat engaging portion and said second seat portion radially flexing relative to one another as said second seat portion is axially received by said first seat engaging portion and said second seat engaging portion and said first seat portion radially flexing relative to one another as said first seat portion is axially received by said second seat engaging portion to resiliently compress said first tube engaging portion and said second tube engaging portion about the tube and resiliently restrain said first seat engaging portion against said second seat portion and said second seat engaging portion against said first seat portion to interlock said first clamping member with said second clamping member.

15. The improvement of claim 14, wherein said first clamping member is symmetric with said second clamping member.

16. The improvement of claim 15, wherein said first seat engaging portion includes a first axial lead-in portion adapted for receiving said second seat portion therein and said second seat engaging portion includes a second axial lead-in portion adapted for receiving said first seat portion therein.

17. The improvement of claim 16, wherein said first clamping band defines a first throughhole and said second clamping band defines a second throughhole, said first throughhole and said second throughhole being adapted for receiving first and second fasteners therethrough.

18. The improvement of claim 17, wherein said first throughhole is adjacent to said first seat engaging portion and said second throughhole is adjacent to said second seat engaging portion.

\* \* \* \* \*